US008279117B2

(12) United States Patent
Nelson

(10) Patent No.: US 8,279,117 B2
(45) Date of Patent: Oct. 2, 2012

(54) BURST OPTIMIZED TRACKING ALGORITHM

(75) Inventor: Larry A. Nelson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 275 days.

(21) Appl. No.: 12/277,192

(22) Filed: Nov. 24, 2008

(65) Prior Publication Data

US 2010/0127930 A1 May 27, 2010

(51) Int. Cl.
*H01Q 3/00* (2006.01)
*G01S 3/56* (2006.01)

(52) U.S. Cl. .......................... 342/359; 342/425; 342/436

(58) Field of Classification Search .......... 342/422–431, 342/436, 359
See application file for complete search history.

(56) References Cited

U.S. PATENT DOCUMENTS

| | | | | |
|---|---|---|---|---|
| 2,410,831 | A * | 11/1946 | Maybarduk et al. | 342/74 |
| 2,720,647 | A * | 10/1955 | Shepherd et al. | 342/138 |
| 3,116,418 | A * | 12/1963 | Fairbanks | 250/348 |
| 4,176,356 | A * | 11/1979 | Foster et al. | 342/367 |
| 5,001,490 | A * | 3/1991 | Fichtner | 342/195 |
| 5,946,603 | A * | 8/1999 | Ibanez-Meier et al. | 455/13.1 |
| 6,590,685 | B1 * | 7/2003 | Mendenhall et al. | 398/121 |
| 7,250,915 | B2 * | 7/2007 | Nelson | 343/757 |
| 7,251,455 | B1 * | 7/2007 | Mower et al. | 455/63.4 |
| 7,528,773 | B2 * | 5/2009 | Fall et al. | 342/359 |
| 2008/0139124 | A1 * | 6/2008 | Tillotson | 455/63.4 |

FOREIGN PATENT DOCUMENTS

| | | | |
|---|---|---|---|
| EP | 351934 | A1 * | 1/1990 |
| JP | 2006270806 | A * | 10/2006 |

OTHER PUBLICATIONS

Gabor, D., "Theory of Communication", J. Inst. Electr. Eng., vol. 93, 1946, Inst. Electr. Eng., London, UK.

* cited by examiner

*Primary Examiner* — Jack W Keith
*Assistant Examiner* — Cassie Galt
(74) *Attorney, Agent, or Firm* — Matthew Lussier

(57) ABSTRACT

A system and method for providing a spectrally compact modulation of a tracking signal for directional beam scanning systems is presented. The system and method scans a tracking signal to produce a modulation of the tracking signal. When an impairment is anticipated, the system and method modifies the scan path to avoid the impairment and maintains the spectral compactness of the modulation of the tracking signal.

26 Claims, 12 Drawing Sheets

BURST OPTIMIZED TRACKING ALGORITHM

FIELD

Embodiments of the subject matter described herein relate generally to a system and method for optimizing tracking algorithms of directional and directionally agile communications systems.

BACKGROUND

Communications systems that utilize non-stationary users or relay sites require directional antennas to direct radio signals between stations. These wideband directional communications systems sometimes feature directionally agile phased array antennas (PAA). PAAs use an electrical means of steering a radio signal beam instead of mechanically moving the antenna. Steering the beam using electrical means is substantially faster than moving the antenna mechanically, and eliminates the error-inducing mechanical momentum of moving antennas. PAA's are one example of directionally agile antenna capable of steering a radio signal beam, and can be used by both moving and fixed stations.

Communications systems are designed to be as efficient as possible, both in terms of spectral efficiency and power efficiency. Moving stations require tracking systems to assist in directing radio signal beams. Tracking systems ensure that beams widths can be kept as narrow as possible. Narrow beam widths reduce the amount of power necessary for effective communication between stations, prevent unwanted parties from potentially receiving signals, and prevent overlap of signals onto spatially adjacent receivers, which is important for regulatory compliance.

Prior art tracking systems are generally constructed for continuous tracking operations and symmetric beams. In practice however, placement of the actual antennas on moving platforms often results in that expected continuity being interrupted, either due to maneuvering of either the source or the sender, by operation of external noise sources, or by intervening obstructions. These interruptions and interferences change the nature of the tracking signal, potentially corrupting the tracking signal and otherwise degrading the accuracy of the tracking capability. This in turn reduces the effective data capacity of line of sight data links between stations.

SUMMARY

Presented is a system and method for optimizing tracking algorithms of directional communications systems for enhancing data communications between sending and receiving parties. In various embodiments, the system and method improves tracking accuracy and robustness, resulting in better data link power margins, higher data capacity, and improved beam directionality. In other embodiments, the system and method anticipates beam interruptions or other impairments and modifies the tracking algorithm to minimize the effect, duration, and spectral inefficiency of the interruption or impairment. By proactively compensating for the anticipated interruptions and other impairments, the system and method provides for data links with higher average throughput and subsequently lower costs per bit, promotes spectral efficiency, and improves security.

In one embodiment of the system and method, the scan path is dynamically apodized such that the scan path begins as a spiral path outward and progresses to a steady state equal amplitude scan during a non-impaired portion of the transmission, and spirals inwards in anticipation of a predicted impairment. In another embodiment of the system and method, the scan path is changed to avoid interruptions and maximize line-of-sight directionality between antennas. In another embodiment, the scan path is modified to increase spectral compactness of the modulated tracking signal. In another embodiment, the rate of scanning of the tracking signal is changed to avoid system noise.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the burst optimized tracking system and method. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Most communications systems have infrastructure and users. In most terrestrial, satellite-based, and wireless networks, infrastructure is fixed in place in an organized hierarchy and users are either fixed or mobile. However, dynamic communications systems can be created where the mobile users also function as relay sites and other infrastructure can also be mobile. In these dynamic communications systems, it becomes increasingly important to be able to directionally control signal transmission as the relay sites and other mobile infrastructure elements (hereafter mobile network elements) dynamically change their position. Directional control of signal transmission conserves power utilization by allowing narrow beams to be used to communicate between mobile network elements instead of using wider angle transmissions. Directional control also conserves spectrum, by allowing multiple mobile network elements to use one or more common frequencies in a non-interfering manner.

As mobile network elements move, the architecture of the dynamic communications system can change. Connections between mobile network elements may therefore start and stop in differing periods of connectivity. Also, data may not be sent in a consistent manner between mobile network elements, but instead be sent in short bursts, thereby requiring only short periods of connectivity between individual mobile network elements. Further, depending upon the instantaneous architecture of the dynamic communications system, some mobile network elements may serve as hubs, or relay points, for multiple other mobile network elements.

Figure 1:
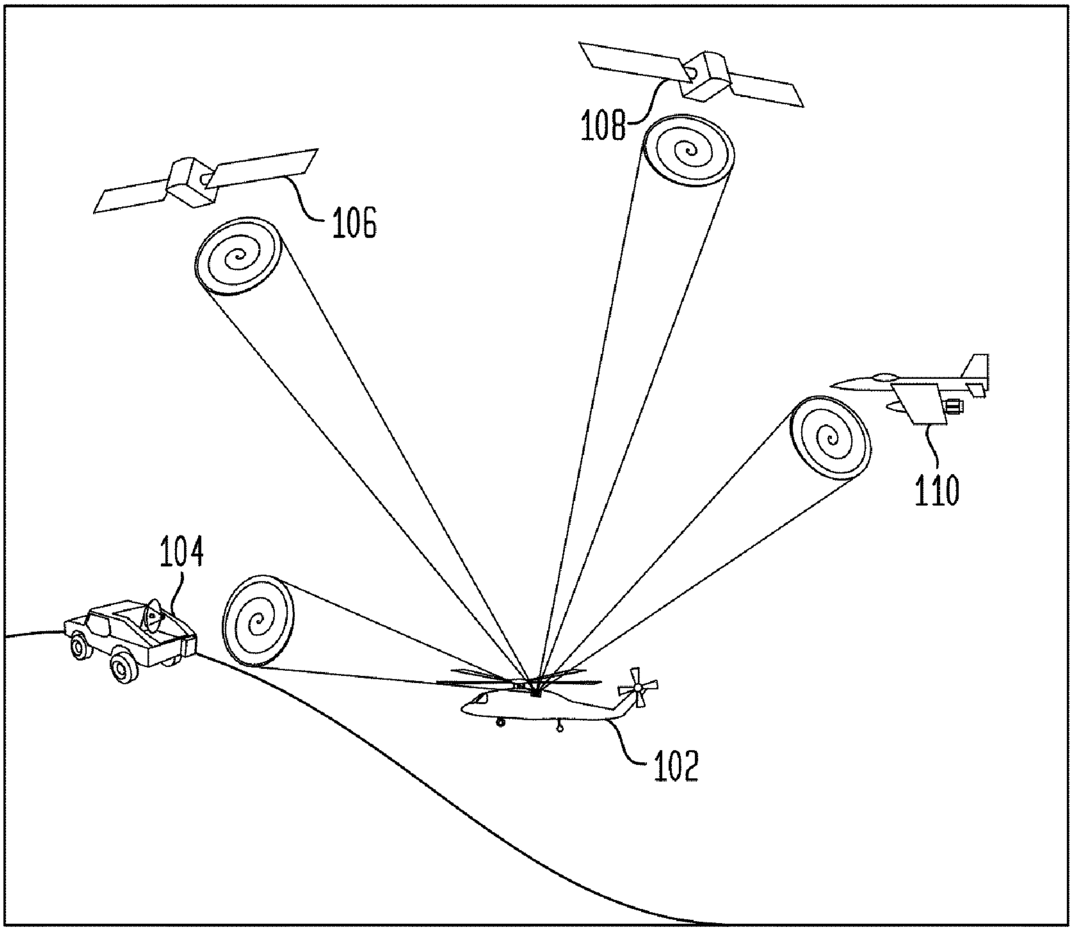
FIG. 1 is an illustration of beam paths for multiple relay sites in one embodiment of the burst optimized tracking system and method.

Referring now to FIG. 1, in a graphical representation of a portion of a dynamic communications network 100, a hub mobile network element 102 communicates with subtended relay mobile network elements 104, 106, 108, and 110. The directionally agile antenna, or Phased array antennas (PAA 101), in hub mobile network element 102 is steered to each subtended relay mobile network 104, 106, 108, 110. Phased array antennas, such as PAA 101, are one kind of directionally agile antenna that can rapidly be steered towards multiple mobile network elements with a responsiveness that is suitable to networks between mobile network elements. To maximize transmission range, efficiency, and bandwidth, the antenna of a first mobile network element, e.g., hub mobile network element 102, points at the antenna of a second mobile network element, e.g., subtended relay mobile network 104, 106, 108, 110. Generally, communications are two-way between the first and second mobile network elements, and each mobile network element 102, 104, 106, 108, 110 sends a signal towards the other mobile network element during transmission of data. Note that for any mobile network element 102, 104, 106, 108, 110, a single antenna may both transmit and receive, or two or more separate antennas in close proximity may also be used.

Previous solutions for directional beam tracking systems are designed around steady state tracking requirements and generally utilize circularly symmetric radiation patterns. For example, a directional antenna, such as a dish type antenna, is pointed towards the source of the signal and a scan is then performed by a steering means that mechanically moves the dish antenna using a system of gears and motors. Typically, the gears and motors move the dish antenna mechanically in a symmetrical fashion about the expected center of the received signal beam. This is referred to as a conical scan.

Although the figures and examples disclosed herein specifically reference directionally agile antennas, the systems and methods disclosed are applicable to both directional antennas and directionally agile antennas. A directionally agile antenna, such as PAA 101, functions similarly to a directional antenna, but performs the pointing and scanning electronically instead of mechanically. The steering means that performs the pointing and scanning for a directionally agile antenna, rather than being mechanical, is typically an electronics package comprising one or more microprocessors or digital signal processing systems, and associated digital to analog converters and amplifiers. The offset error for a directionally agile antenna can be measured by introducing a circular scanning motion at a small angle around the expected center of the signal beam. If the receiving main lobe is symmetric, offset in true position of the signal beam from boresight, or direct alignment, will appear as a sinusoidally modulated tracking signal 404 at the scanning frequency. The scanning motion may be a conical scan in some instances.

Figure 2:
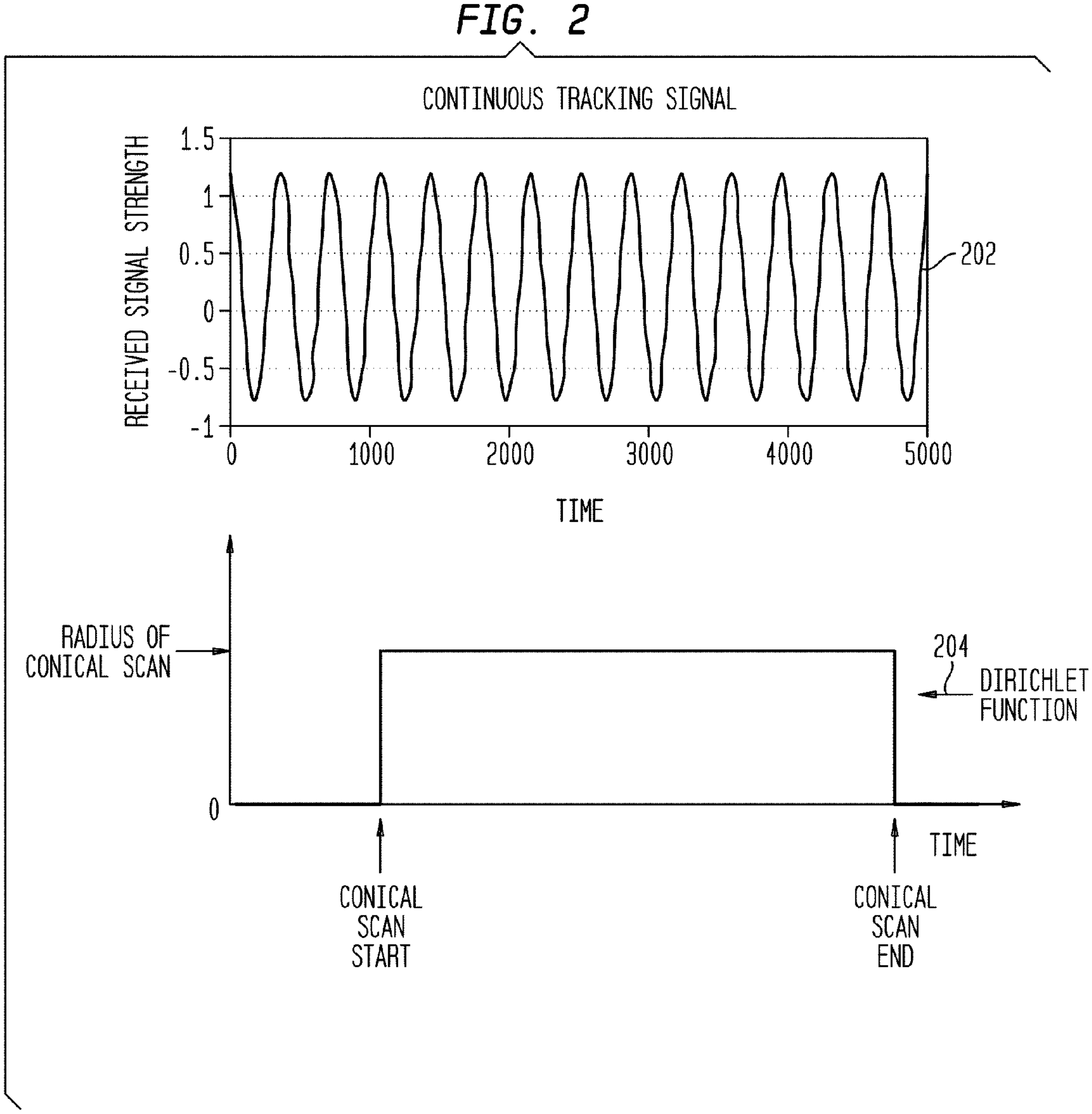
FIG. 2 is an illustration of a received tracking signal of one embodiment of the burst optimized tracking system and method.
Figure 3A:
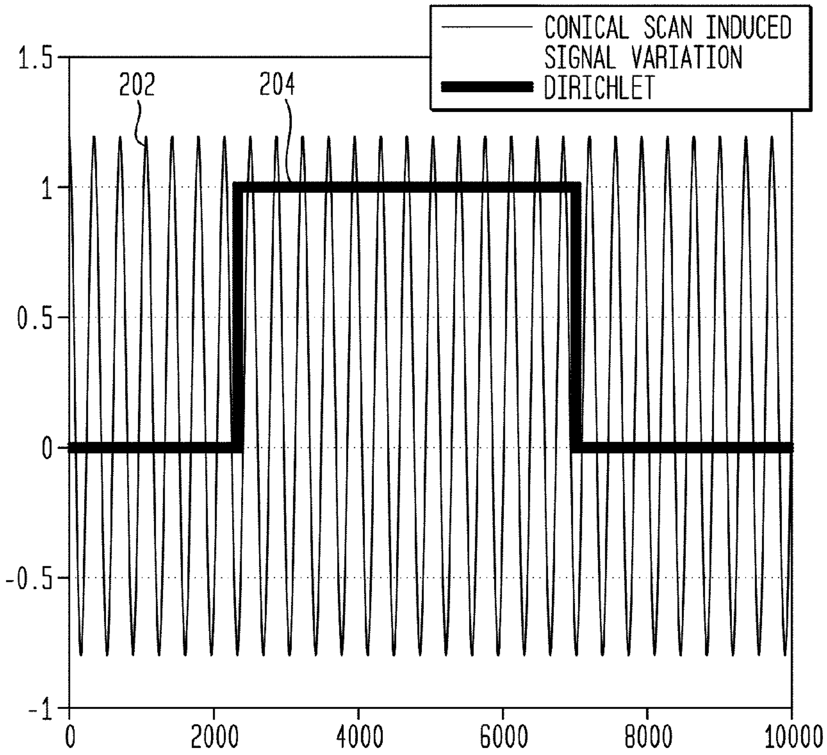
FIG. 3 is an illustration of an unapodized received tracking signal of one embodiment of the burst optimized tracking system and method.
Figure 3B:
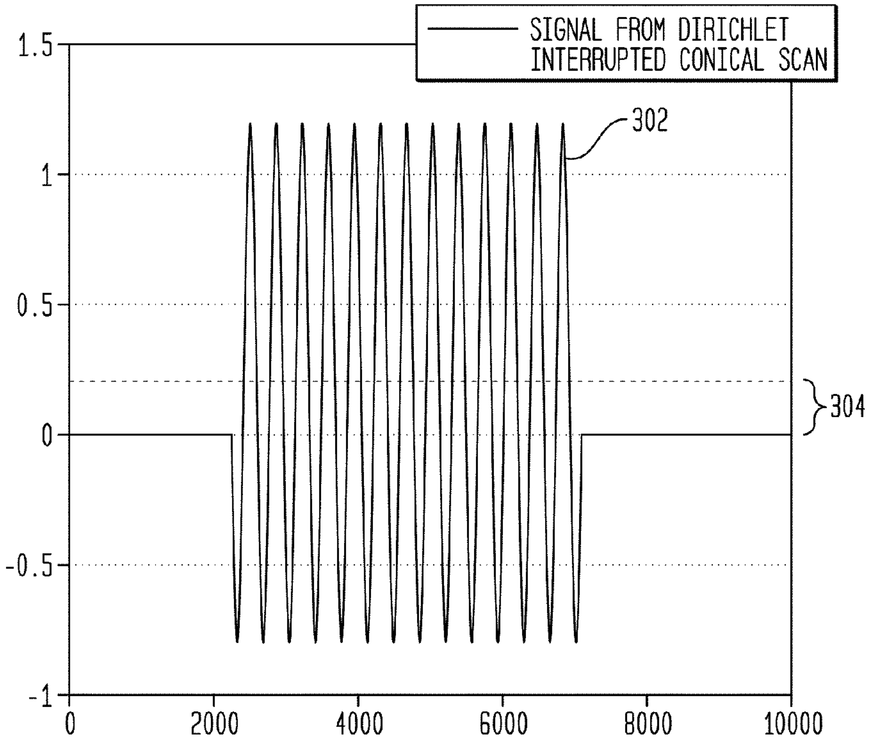

Referring now to FIG. 2, the tracking algorithm receives the modulated tracking signal 202 shown here in a steady state representation that is interrupted by a start and stop function. The beginning and end of the scan is represented by an enabling Dirichlet function 204 so that just a portion of the steady state modulated tracking signal 202 determines the offset error. Referring to FIG. 3A, the Dirichlet function 204 is applied to tracking signal 202 resulting in the Dirichlet-enabled portion of the scan 302 as shown in FIG. 3B. Continuing to refer to FIG. 3B, the Dirichlet-enabled portion of the scan 302 shown in this example has a net offset 304 due to the receiving antenna being slightly off boresight with the sending antenna. This, net offset 304 is then processed by a scanning algorithm, such as the continuously operating synchronous demodulation process 500 of FIG. 5 to produce the tracking error signal output 510, and the orientation of the antenna is adjusted towards boresight. Although the net offset 304 is shown as a constant DC offset in FIG. 3B for ease of description, in mobile network elements 104, 106, 108, and 110 (not shown in FIG. 3B) may be moving relative to one another and the net offset 304 will therefore not be a constant DC value, but rather will vary over time, typically in a low frequency manner.

Some directionally agile antennas, most notably PAA 101 systems as implemented in some aircraft, can have asymmetries in the scan causing extra modulation of the otherwise sinusoidal tracking signals 404. This extra modulation of the tracking signal 404 causes a less spectrally compact tracking signal compared to a generally sinusoidal tracking signal. This lack of spectral compactness increases the required filter 508 bandwidth in the tracking system, decreasing the signal-to-noise ratio and degrading tracking accuracy. In one embodiment of this disclosure, an equal amplitude scan adjusts the scan to the particularities of directionally agile antenna such that the beam attenuation of scanning around the expected center of the signal beam is as uniform as practicable for the entire scan.

Generally, scanning creates spatial modulation of the beam to create a tracking signal 404 that is processed to determine the tracking error signal output 510. The tracking signal 404 has amplitude dependent upon beam shape and the beam path. An equal amplitude scan adjusts the scan path in light of the beam shape. An explanation of the method is presented in one dimension, x, however the method is applicable to multiple tracking dimensions. A commonly used uncertainty metric, often attributed to Gabor [Gabor, D., "Theory of Communication", J. Inst. Electr. Eng., Vol. 93, 1946] and incorporated herein, is the product of two effective widths, $$U=(\Delta x)(\Delta\omega)$$

where these widths are the normalized variance of the energy density in the spatial and spatial frequency domains.

$$(\Delta x)^2 = \frac{\int (x - x_0)^2 |g(x)|^2 dx}{\int |g(x)|^2 dx}$$

$$(\Delta \omega)^2 = \frac{\int (\omega - \omega_0)^2 |G(\omega)|^2 d\omega}{\int |g(\omega)|^2 d\omega}$$

This product has a lower bound, or uncertainty, $$U \geqq 0.5$$

and Gabor showed that the complex function, $$g(x) = e^{j(\omega x + \theta)} e^{-\left(\frac{x^2}{2\sigma^2}\right)}$$

achieves the lower bound. Note that this is a product of a periodic scan having a spectrally compact nature times a Gaussian apodization function. Note that Δx and Δω are normalized energy density, therefore $$g(x) = K e^{j(\omega x + \theta)} e^{-\frac{x^2}{2\sigma^2}}$$

where K is a constant, also achieves the lower bound. If K is not constant, then its modulation K(x) will alter G(ω) and the uncertainty product U will increase. The amount of increase associated with a scan design can be calculated and minimized by changing the modulation and the basic scan path. For any given beam shape and search pattern, the figure of merit for spectral compactness can be calculated:

$$U = \min[(\Delta x)(\Delta \omega)]$$

where U is calculated over the entire scan path and the scan path is closed.

The beam shape is traversed as near as possible to equal amplitude since a constant amplitude is normalized to have no affect on reaching the minimum U. Any amplitude modulation of the beam will create beam spreading in the frequency domain. That is, if an equal amplitude profile is traced on the beam, no modulation occurs at the scan frequency even though the tracking signal 404 is created. Further, for small tracking errors, a small amount of energy K(x) is created at the scanning frequency so the modulation of K(x) does not increase the uncertainty product significantly. Alternative scan designs that are not on equal amplitude paths create large amount of energy and raise U. The term equal amplitude is used herein to designate a scan path wherein an effort is made in the scan design to minimize U and therefore achieve a spectrally compact result. An equal amplitude scan path is optimized to present an improved accuracy spatial and polarization characterization in less spectral space for the particular antenna beam shape. For some beam shapes, an equal amplitude path may be very difficult, leading to a compromised scan design. The amount of the compromise can be minimized as suggested by careful selection of the scan path in light of the beam characteristics.

In practice, measurements of the tracking error signal strength are also perturbed by noise arising from vibration, positioning errors in the circular scan, and electronic noise.

Figure 5:
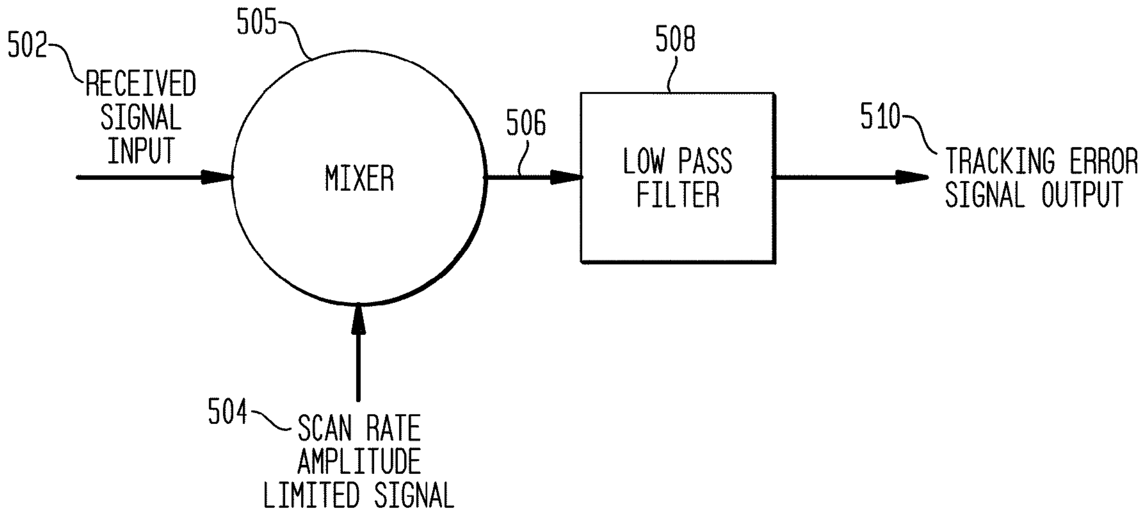
FIG. 5 is a block diagram of a synchronous demodulator of one embodiment of the burst optimized tracking system and method.

These noise components depend upon the environment surrounding the system. These noises generally do not occur at the scanning rate. Therefore, prior art systems remove them using a synchronous demodulation process to recover an accurate error signal with a relatively high signal-to-noise ratio, creating a system that is resistant to many environmental perturbations. Referring now to FIG. 5, a continuously operating synchronous demodulation process 500, also called a product demodulator, rejects signals that do not occur at the equal amplitude scanning frequency. The received signal 502 is received from the antenna, which is continuously moving in a closed scan path. The received signal 502 is applied to the mixer 505 with an amplitude limited signal 504 that has the same frequency as the equal amplitude scanning frequency. Usually, the amplitude limited signal 504 is an amplitude adjusted version of the same signal used to drive the equal amplitude scan. The mixer output 506 is then filtered using a low pass filter 508, also called a reconstruction filter, that removes all higher order harmonics. The remaining signal is the low frequency offset of the tracking error, or tracking error signal output 510.

Figure 6:
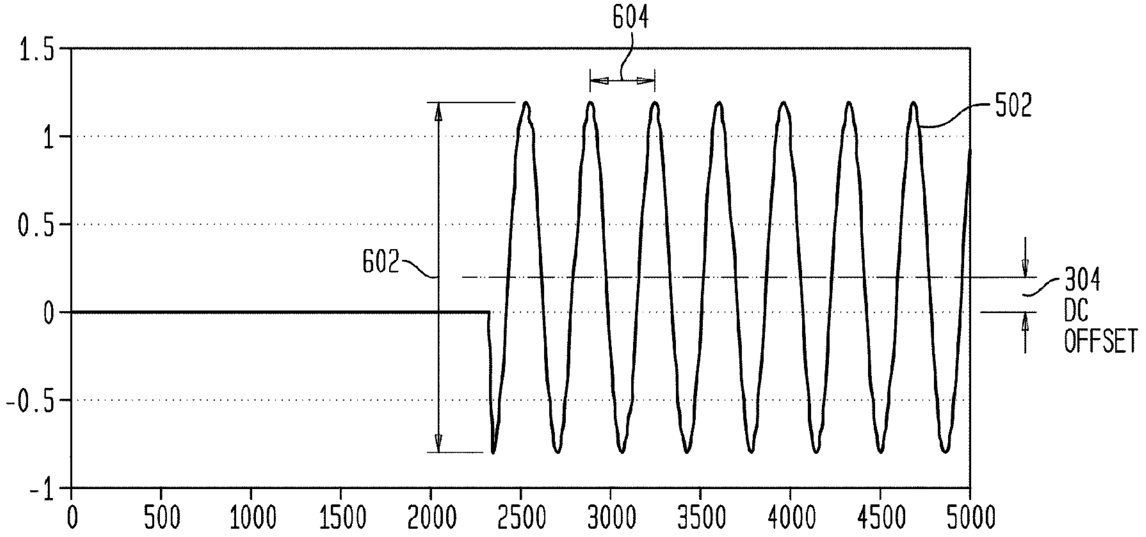
FIG. 6 is an illustration of a beginning of a received tracking signal of one embodiment of the burst optimized tracking system and method.
Figure 7:
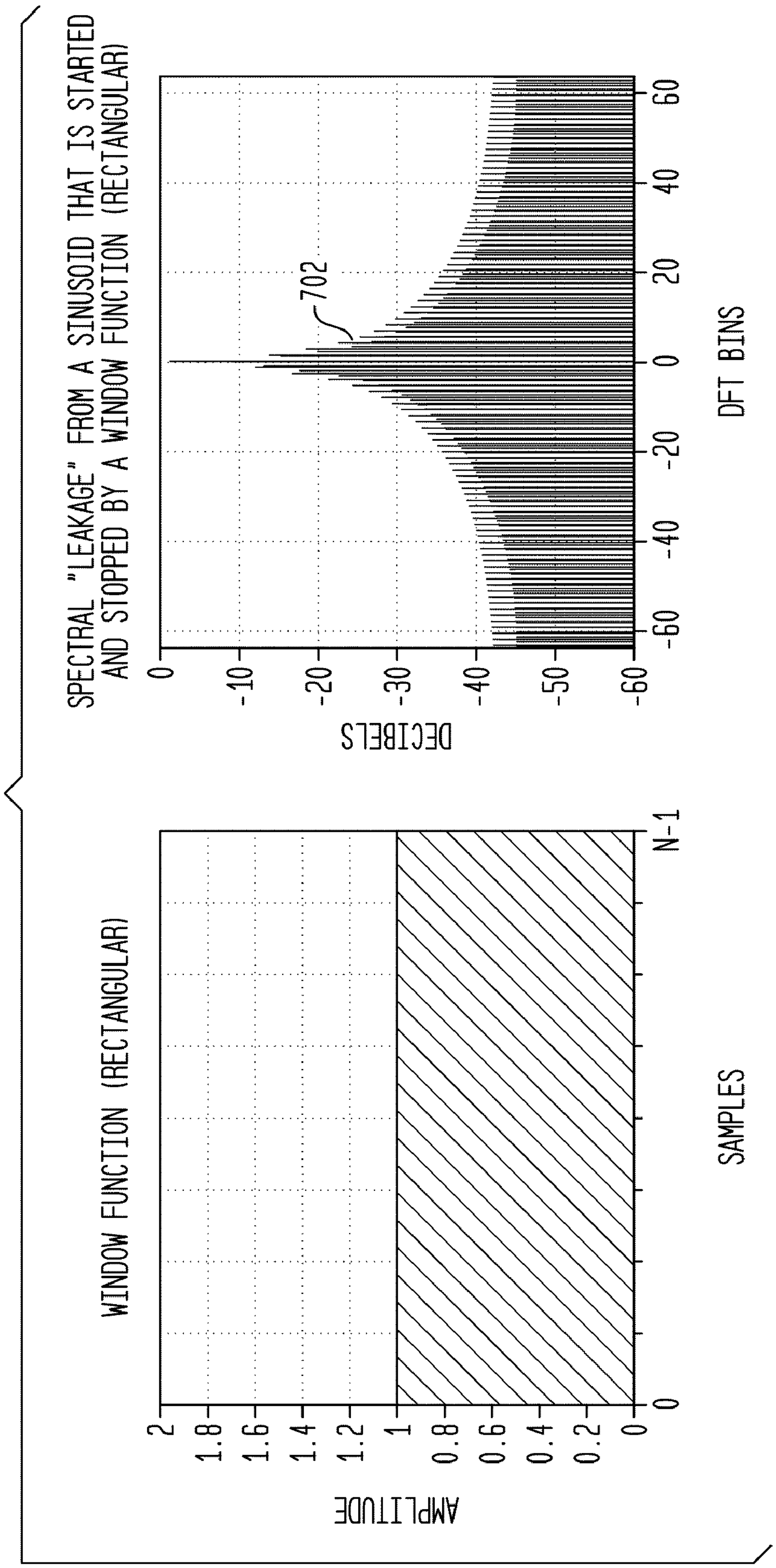
FIG. 7 is an illustration of spectral leakage from an unapodized received tracking signal.

Referring now to FIG. 6, a received signal 502 from an antenna having an orientation slightly offset from boresight is illustrated. The equal amplitude scan results in an approximately sinusoidal variation in signal strength at the scan rate of the antenna with a constant term DC offset or a low frequency net offset 304. Because of the directionality of the antenna, both the net offset 304 and the sinusoidal amplitude 602 are proportional to the amount of offset of the antenna from boresight. Referring now to FIGS. 5, 6 and 7, the portion of the spectrum 702 associated with the received signal 502 that occurs at the scanning frequency has amplitude that depends upon the tracking error. As indicated above, the equal amplitude scan frequency driving the scanning also feeds into the mixer 506 as the amplitude limited signal 504. Inside the mixer 505, a synchronous demodulator produces sum and difference frequencies between the received signal 502 and the equal amplitude scan rate signal, or amplitude limited signal 504. A bandpass filter that tracks the scan frequency is accomplished by the mixer 505 difference output 506. The passband of the low pass filter 508 rejects the mixer images and limits the tracking signal passband, thereby determining the amount of noise that the tracking error signal output 510 contains. For a continuously operating equal amplitude scan, the spectral purity of the tracking error signal output 510 at the equal amplitude scan frequency is very high, and the phase noise is very low, if the antenna beam pattern is circular. So long as the tracking changes occur slowly, a narrow low pass filter 508 averages the tracking signal over many equal amplitude scan cycles 604 resulting in an accurate tracking indication.

Figure 4:
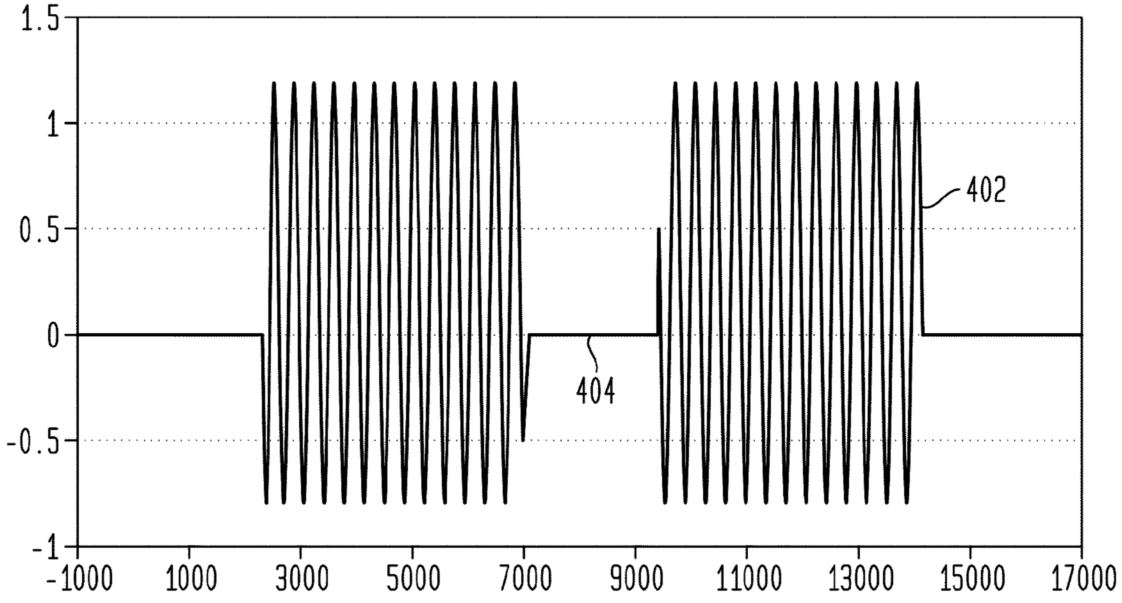
FIG. 4 is an illustration of an interrupted received tracking signal of one embodiment of the burst optimized tracking system and method.

There are several problems with this straightforward approach. In communications system that send or receive data in bursts, there may be fewer tracking cycles that can be used to obtain an accurate track. Also, in real world conditions, tracking signals can be interrupted or impaired. Referring now to FIG. 4, the receiving antenna's line of sight to the sending antenna is interrupted, as shown by the loss of tracking signal 404. This loss of tracking signal 404 could be due to an obstruction to the line of sign by part of the mobile network element, for example a mast obstruction on a turning ship, or a helicopter blade temporarily blocking the signal. Other potential impairments of the tracking signal include the sender turning off the tracking signal temporarily or redirecting the tracking signal to a different mobile network element, noise, multipath signal transmission, and other complex modulations and distortions of the tracking signal, such as those caused by intervening porous objects such as lattice-type ship masts. Still other sources of variation in the tracking signal are vibrational movement of the receiving antenna itself and physical scan angle limitations of the antenna.

Steady state tracking systems generally use circularly symmetric radiation patterns at a fixed scan rate, for example one equal amplitude scan per second with a 0.1 degree fixed offset angle. This scan rate and scanning pattern does not provide optimal information for reducing the effects of very short term periodic interruptions, such as propeller blade interruptions on an aircraft. Nor does this scan rate and pattern provide information that could be utilized to reduce the effects of longer period interruptions, such as ship masts moving with respect to the line of sight in sea-induced motions.

As shown in FIG. 4, this loss of tracking signal 404 occurs within a Dirichlet-enabled portion of the scan 302. Steady state tracking systems that do not compensate for tracking interruptions introduce phase noise (i.e., energy spreading in the spectral domain) into the control loop of the tracking system. In order to assure a good tracking signal-to-noise ratio and adequate transient response, the tracking loop filter bandwidth is required to be large enough to pass the phase noise which arises as a consequence of any abrupt interruptions. This unnecessarily increases the tracking loop bandwidth which leads to a decreased signal-to-noise ratio, thereby degrading tracking accuracy.

Referring again to FIG. 5, when the tracking signal input 502 is impaired or not contiguous, the synchronous demodulator 500 is unable to filter the signal without losing the signal itself. When the received signal 502 has been interrupted or turned on or off rapidly, that transition creates spectral leakage, also known as phase noise, that must feed into the control loop of the tracking system or there will be tracking errors. Referring back to FIG. 1, when the PAA 101 in hub mobile network element 102 jumps from orienting towards one subtended mobile network element 104, 106, 108, 110 to orienting towards another subtended mobile network element 104, 106, 108, 110, and immediately begins a new equal amplitude scan, there is a similar sharp transition where the system at one instant does not have a signal and at a later moment does have the tracking signal associated with the new equal amplitude scan, as is illustrated in FIG. 6. The sharper this transition between states, the greater the phase noise. The tracking system low pass filter 508 must pass this broadened spectrum in order to perform tracking accurately. If the low pass filter 508 were constructed for continuous operation, the broadened spectrum will not be passed, leading to increased tracking error. The error in the tracking system will decrease as additional equal amplitude scan cycles 604 are completed; alternately, as the duration of these interruptions decreases, a broader low pass filter 508 is required which will decrease the signal-to-noise ratio of the tracking signal, allowing more errors in the tracking system. In a system designed for agility and burst transmissions, the faster the PAA 101 in hub mobile network element 102 jumps between subtended mobile network elements 104, 106, 108, 110, the broader the low pass filter 508 needs to be, causing a poorer signal-to-noise ratio in the tracking error signal output 510.

Interruptions therefore cause transient aberrations in the tracking error signal output 510 if the low pass filter 508 is designed for a bandlimited input and pass through a low pass filter 508 that has excessively wide bandwidth resulting in a poor signal to noise ratio. A low pass filter 508 designed for a steady state scan is similarly too narrow to pass a non-steady state waveform and the result of the interruptions are transient aberrations in the tracking error signal output 510. A solution is to modify the scanning method as presented in this disclosure.

In one embodiment of the present system and method, a line-of-sight interruption of a directional beam is anticipated by the system. Some non-limiting examples of predictable interruptions than can be anticipated by the system include: when a directionally agile beam is steered from one subtended mobile network element 104 to another subtended mobile network element 106; movement of a subtended mobile network element 104, 106, 108, 110 that can be predicted to result in an obstruction in the line-of-sight between mobile network elements; and a periodic or quasi-periodic movement of an obstruction into the line-of-sight, for example a helicopter or propeller blade. The term anticipate encompasses both those interruptions that are predictable but have not yet occurred, and those interruptions that have occurred in the past and are therefore anticipated to occur in the future. The term anticipate is therefore to be interpreted broadly to include anticipating that occurs as a response to a previous interruption, for example, anticipating a future interruption in response to a previous periodic, quasi-periodic, or otherwise predictable aperiodic interruption.

The system and method anticipates the interruption and modifies the directional beam scan path in anticipation of the interruption by spiraling the direction beam scan path inwards from the equal amplitude scan, for example to a steady point. Instead of receiving sudden transitions in the tracking signal input 502, the synchronous demodulator receives a spectrally compact modulated tracking signal at the receiving signal input 502 as the scan spirals inward. The inward spiral scan gradually reduces the amplitude 602 of the received signal input 502 while maintaining approximately the same frequency of the scan cycle 604 producing a tracking error signal output 510 without transient aberrations caused by bandlimiting. When the anticipated interruption occurs, the received signal input 502 to the mixer 505 no longer has spectral components at the same spectral distribution as the scan cycle 604 and therefore will not corrupt the tracking error signal output 510. Once the obstruction clears, the system modifies the directional beam scan path by spiraling the direction beam outwards back to the original equal amplitude scan and the synchronous demodulator 500 produces a tracking error signal output 510 without transient aberrations caused by any bandlimiting in the low pass filter 508. Modulating the equal amplitude scan into a spiral, whose path winds inward to a point in anticipation of an interruption and then back outward once the interruption passes, therefore creates a spectrally compact wavelet form in the time domain tracking signal instead of a spectrally broad tracking signal.

Figure 8A:
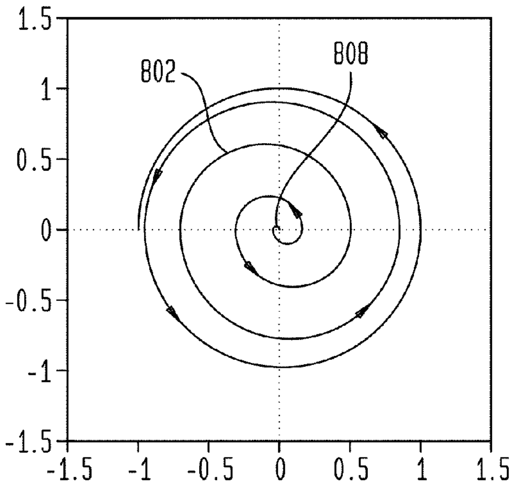
FIG. 8 is an illustration of an apodized equal amplitude scan of one embodiment of the burst optimized tracking system and method.
Figure 8B:
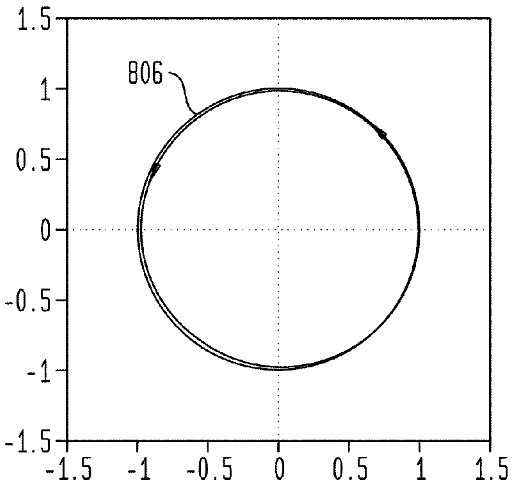
Figure 8C:
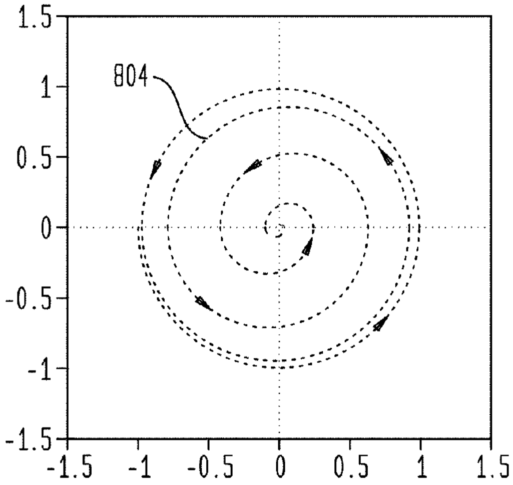
Figure 8D:
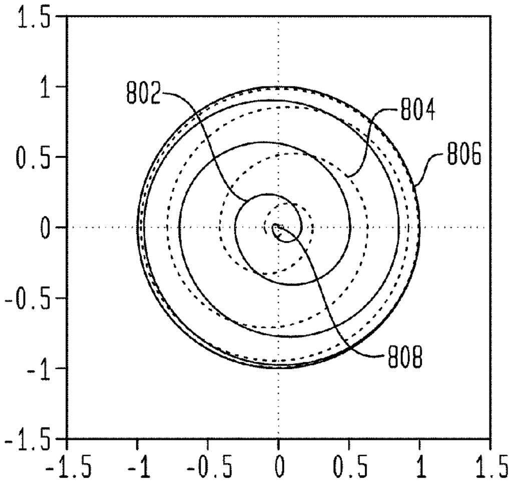
Figure 9:
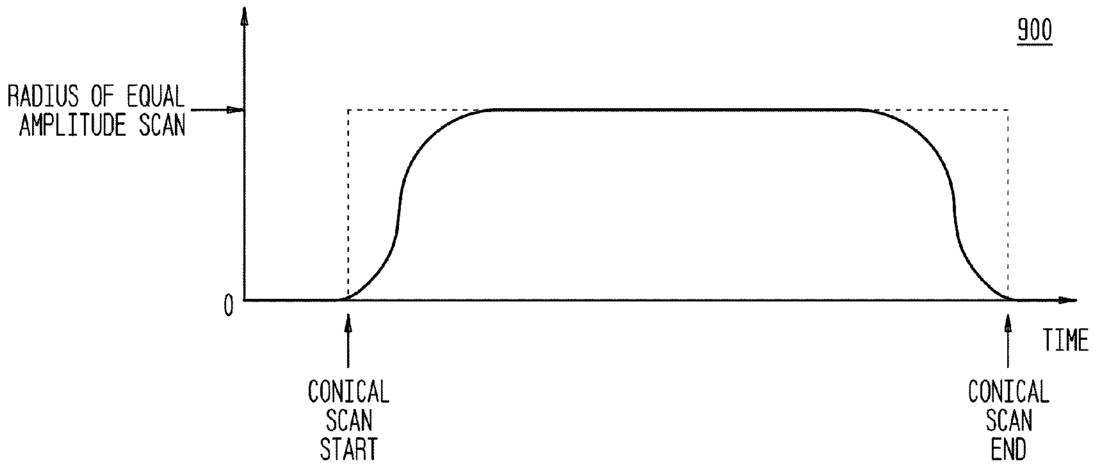
FIG. 9 is an illustration of an equal amplitude scan function, with apodized start and stop, of one embodiment of the burst optimized tracking system and method.
Figure 10:
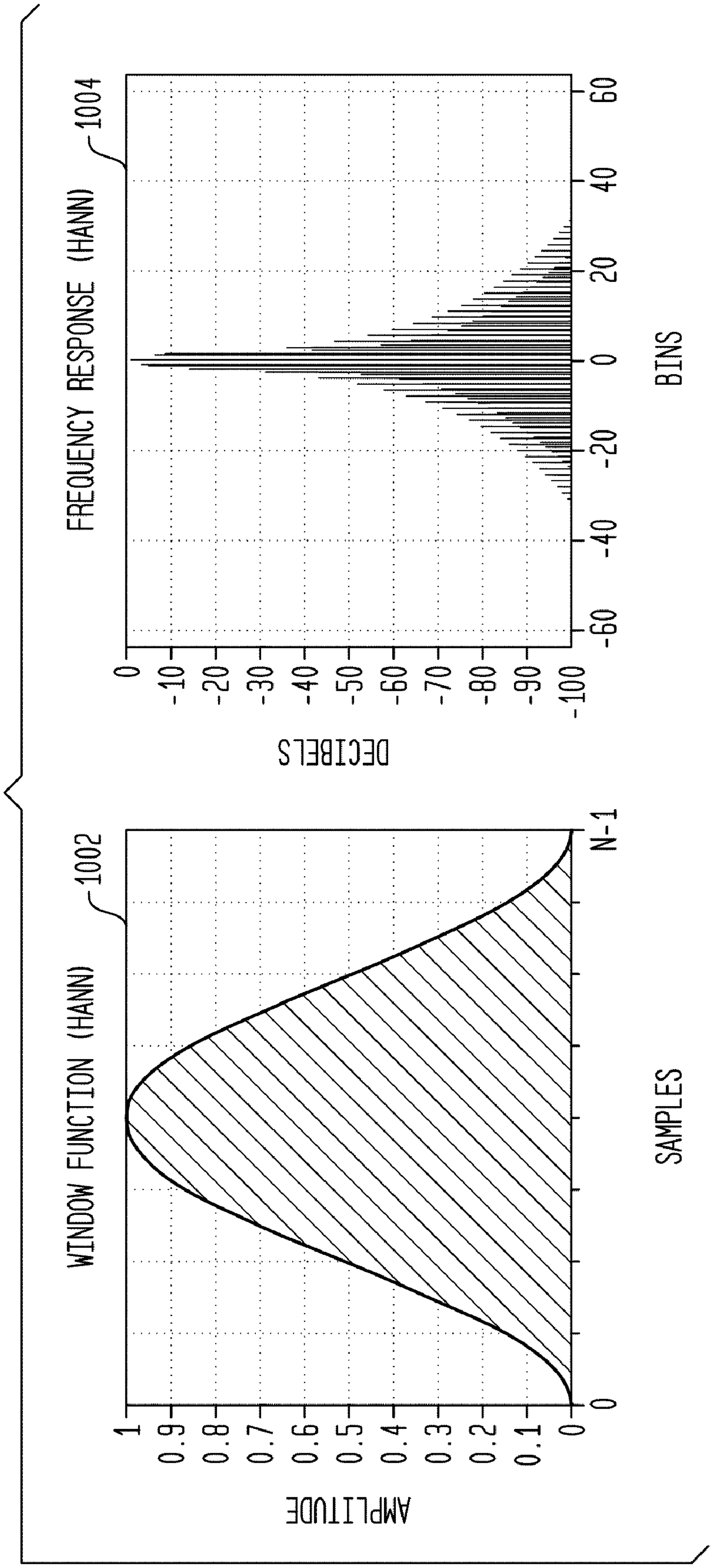
FIG. 10 is an illustration of an example raised cosine apodization function and associated spectral compactness of one embodiment of the burst optimized tracking system and method.

Referring now to FIGS. 8A, 8B, 8C, 8D the scan path is viewed from the point when scanning first begins until the scanning ends. In this embodiment, the scan path is designed to apodize the creation and attenuation of a tracking signal as shown in FIG. 8D, and as deconstructed into FIGS. 8A, 8B, and 8C for illustration purposes only. The initial position 808 is determined by knowledge of the sender's and receiver's positions and begins at signal availability, when the line-of-sight becomes unobstructed. A generally spiral scan path 802 progresses outwards from initial position 808 as shown in FIG. 8A. The spiral scan path 802 progresses outwards to a steady state generally equal amplitude scan 806 as shown in FIG. 8B. The scan path continues in this steady state generally equal amplitude scan 806 while the signal is uninterrupted. Then, as illustrated in FIG. 8C, a complementary equal amplitude collapsing spiral scan path 804 begins in anticipation of the signal interruption. The creation and attenuation of the scan path, as illustrated in FIG. 8D, apodizes the discontinuous tracking signal as represented in FIG. 9. Referring now to FIG. 10, in an alternate embodiment, the particular apodization function 1002 is selected to optimize signal compactness 1004 for the duration of the signal path between interruptions. In various embodiments, the apodization functions 1002 include a Hamming window (not shown), a Hann window, a Cosine window (not shown), a Lanczos window (not shown), a Gaus window (not shown), or Nuttall window (not shown). These apodization functions are applied to the spiral portions of the scan path, specifically spiral scan path 802 and collapsing spiral scan path 804.

Figure 11:
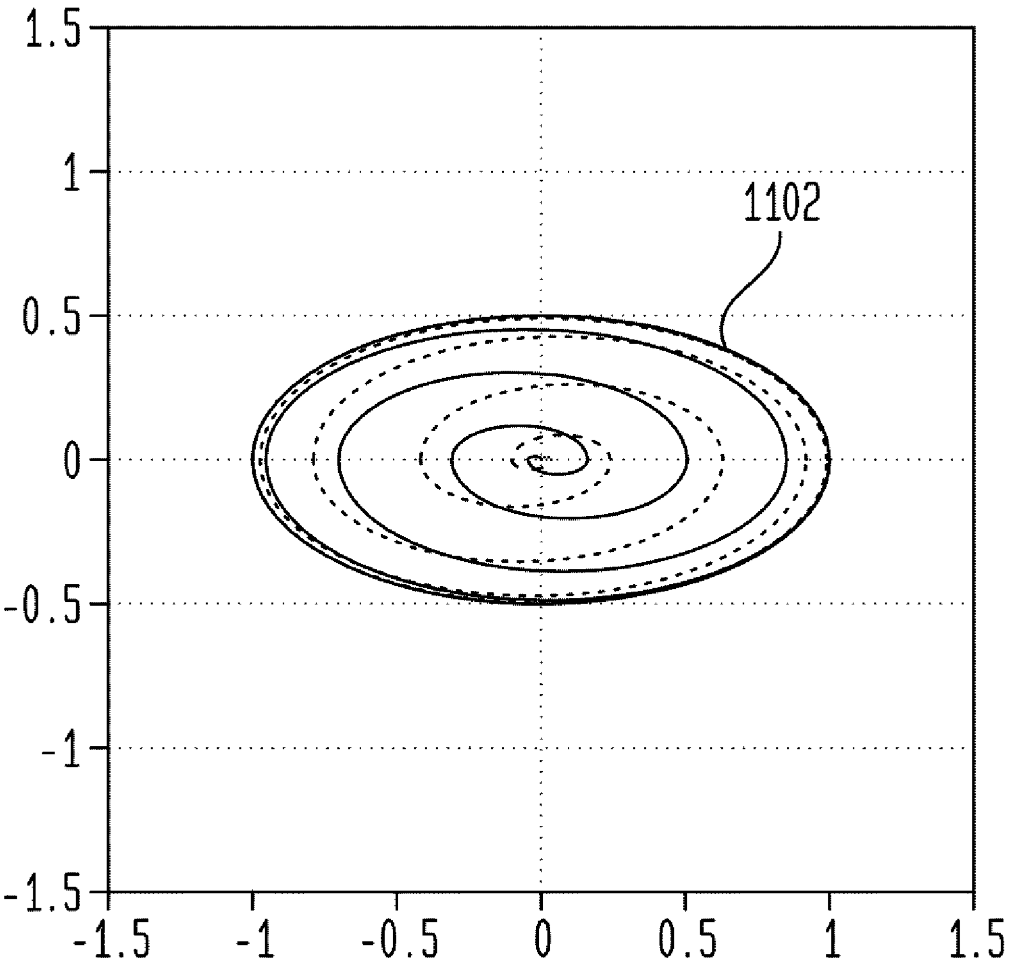
FIG. 11 is an illustration of a discontinuous equal amplitude scan function of one embodiment of the burst optimized tracking system and method.

In another embodiment, if the line-of-sight is not completely occluded, the scan path is modified to avoid tracking signal interruption by spiraling inward to a reduced amplitude scan having a smaller radius or by modifying the scan path to an elliptical path 1102 as shown in FIG. 11. An ellipse in two dimensions is formed by two generally sinusoidal excitations of unequal amplitude each on an axis orthogonal to the other. This signal structure is still spectrally compact, i.e., well bandlimited. In an alternative embodiment, the scan path is modified to a periodic or aperiodic path designed to avoid the interruption, for example through changes in scan rate and scan offset, while providing a usable tracking signal that is relatively well bandlimited to the tracking signal input 502 of the synchronous demodulator 500.

In another embodiment, the equal amplitude scan rate is selected to occur in the portion of the tracking signal input noise power spectrum 1204 to coincide with minimum system noise. Noise components generally depend upon the environment surrounding the system and generally arise from vibration, positioning errors in the scanning process, multipath reception, and intermittent electronic or electromagnetic noise. System noise is tracked and the scan rate, amplitude, and ellipticity of the scan path are dynamically selected according to measurements of noise power spectrum at the tracking signal input.

Figure 12:
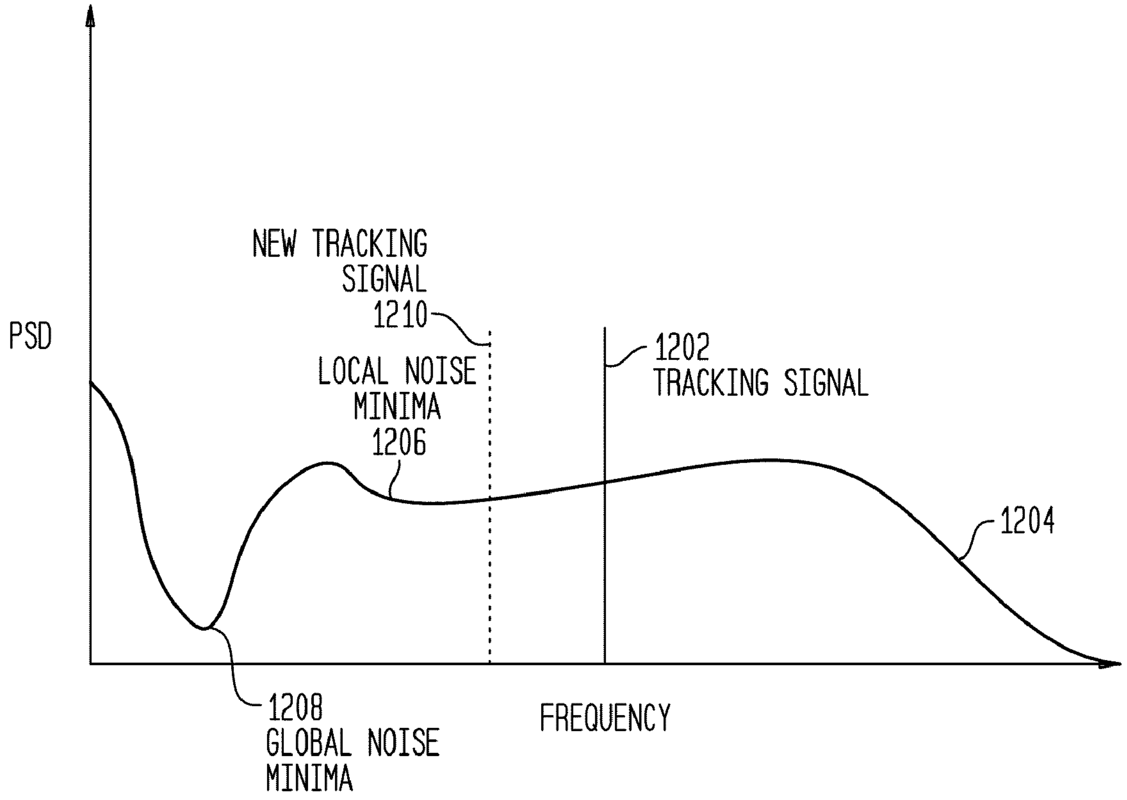
FIG. 12 is an illustration of system noise power spectrum of one embodiment of the burst optimized tracking system and method.

Referring to FIG. 12, an example tracking signal 1202 and the associated noise power spectrum 1204 is illustrated. The noise power spectrum 1204 shows both local noise minima 1206 and global noise minima 1208. The tracking signal 1202 frequency is selected to be at the same frequency as one of the noise minima 1206, 1208, resulting in a higher signal to noise ratio at the mixer output 506 after the synchronous demodulation process in the mixer 505. In one embodiment, the noise for a new tracking signal 1210 at a different frequency is estimated to determine if there would be an signal-to-noise ration improvement from the tracking signal 1202. An estimate of the amplitude of the noise power spectrum 1204 for a new tracking signal 1210 is developed that is independent of the tracking signal 1202. Mathematically, the tracking signal 1202 is represented by s and has a transform denoted S. The noise is represented by x and has a transform denoted X. Because noise is additive, the transform representing power spectrum is S+X times its complex conjugate or $(S+X)(S^*+X^*)$=magnitude $(S)^2$+magnitude $(X)^2$+2*Real(S*X), where magnitude $(S)^2$ represents the power spectrum of the signal s, magnitude $(X)^2$ represents the spectrum of the noise x; and 2*Real(S*X) represents the real part of this transform. In the power spectrum measurement, the noise level x is not additive, but will in general depend on the signal power spectrum s. As S approaches 0, the amplitude of the spectrum provides a guide for estimating the noise x for that new tracking signal 1210. For noise x estimation, the measurement can be delayed to a non-tracking time interval, or the signal s can be modulated at the frequency of the new tracking signal 1210 and the result used to estimate the noise power in the frequency band where the new tracking signal 1210 is occurring. From this result, a minimum noise frequency can be selected for the new tracking signal 1210.

In another embodiment, the steady state path of the equal amplitude scan is selected to achieve sufficient signal-to-noise ratio for tracking and to minimize beam spreading associated with tracking signal modulation.

In another embodiment, the scan path of the equal amplitude scan is selected to produce the most sinusoidal result. Referring again to FIG. 11, some antennas do not produce a circularly symmetric beam, and the received error signal associated with a circular equal amplitude scan is therefore not sinusoidal. Non-sinusoidal tracking signals are not very spectrally compact, increasing the required filter bandwidth in the tracking system and degrading the signal-to-noise ration of the tracking signal. For example, many aircraft have PAAs 101 that are embedded in the aircraft itself to reduce drag, or improve stealth characteristics and do not naturally create circular equal amplitude scans. These PAAs 101 produce asymmetric beams due to limitations in antenna size and placement. By using a somewhat elliptical scan 1102 that follows a generally equal amplitude signal offset profile of the directional beam, a more spectrally compact error signal will result which can be signal processed to create an improved signal-to-noise ratio in the tracking signal. In another embodiment, some directional antennas can change their beam shape electronically, and therefore the scan path is dynamically changed to produce a more spectrally compact error signal. Tracking signals are frequently designed as sampled data structures to ease processing and construction of the controllers. Spectral compactness in the signal provides the bandlimiting required for sampled data reconstruction. Sampling noise is a contributor to tracking system noise.

This disclosure includes both a system and method for modifying the directional beam tracking methodology to compensate for interrupted or impaired tracking signals. The system and method modifies the tracking signal by adapting the scan rate, scan patterns, and scan offset angles so that the tracking system minimizes noise, is spectrally compact, and minimizes the effects of interference and interruptions encountered. These modifications to the tracking methodology improve the agility of directional communications by optimizing tracking conditions and increasing the robustness of the tracking signal. These improvements to the tracking signals allow the mobile network element to minimize beam width and increase power margins, maximize bandwidth capacity and link connectivity, and minimize interference with other radio systems.

The embodiments of the invention shown in the drawings and described above are exemplary of numerous embodiments that may be made within the scope of the appended claims. It is contemplated that numerous other configurations of a burst optimized tracking algorithm may be created taking advantage of the disclosed approach. It is the applicant's intention that the scope of the patent issuing herefrom will be limited only by the scope of the appended claims.

What is claimed is:

1. A method of providing a spectrally compact modulation of a tracking signal in a directional beam scanning system, comprising:

scanning for the tracking signal in a scan path to produce a modulation of the tracking signal;

anticipating an impairment to the tracking signal; and modifying said scan path in anticipation of said impairment so as to maintain the spectral compactness of said modulation, the spectral compactness being the product of a first effective width and a second effective width, wherein the first effective width is a normalized variance of energy density in a spatial domain and the second effective width is a normalized variance of energy density in a frequency domain.

2. The method of claim 1, further comprising:

processing said modulation of the tracking signal to produce a tracking error signal.

3. The method of claim 1, wherein said modifying said scan path further comprises:

apodizing said modulation by spiraling said scan path inwards prior to said impairment to the tracking signal.

4. The method of claim 3, wherein said apodizing further comprises, spiraling said scan path outward to a steady state scan path during a non-impaired interval of the tracking signal.

5. The method of claim 4, wherein said apodizing of said scan path utilizes a window function selected from the group consisting of a Hamming window, a Hann window, a Cosine window, a Lanczos window, a Gauss window, and a Nuttall window.

6. The method of claim 3, wherein said apodizing provides a spectrally compact modulation of the tracking signal to a bandlimiting filter.

7. The method of claim 1, wherein said impairment is a periodic, quasi-periodic, or predictable aperiodic interruption to the tracking signal.

8. The method of claim 1, wherein said impairment is caused by a physical structure and wherein said modifying modifies said scan path to avoid said impairment.

9. The method of claim 1, further comprising:

dynamically modifying a scan rate of said scan path to maintain a threshold signal-to-noise ratio of the tracking signal.

10. The method of claim 1, wherein said scan path is modified to minimize spectral spreading based at least in part on a radially asymmetric beam shape of the directional beam scanning system.

11. The method of claim 10, wherein said scan path is modified to be a substantially equal amplitude scan path.

12. The method of claim 10, wherein said beam shape is modified to reduce said impairment with said scan path being modified to minimize said spectral spreading.

13. The method of claim 1, further comprising measuring a noise power spectrum of the directional beam scanning system and dynamically adjusting a scan rate of said scanning based at least in part upon said measured noise power spectrum to reduce an interference of a noise in said noise power spectrum with said modulation.

14. A system for orienting a receiver in a direction towards a source of electromagnetic radiation, comprising:

a directional antenna configured to scan in a closed scan path in an estimated direction of the source of the electromagnetic radiation to produce a modulated tracking signal; and a steering means for determining a scan path of a scan by said directional antenna, said steering means configured to modify said scan path to a modified scan path in anticipation of an impairment to said modulated tracking signal;

wherein said modified scan path is selected from the group consisting of an elliptical but non-circular scan path, a reduced amplitude scan path, a scan path that minimizes spectral spreading in said modulated tracking signal based at least in part on a radially asymmetrical beam shape of said directional antenna, and an equal amplitude but non-circular scan path.

15. The system of claim 14, further comprising:

a processor configured to process said modulated tracking signal to produce a tracking signal error.

16. The system of claim 14, wherein said directional antenna is selected from the group consisting of a directionally agile antenna, and a phased array antenna.

17. The system of claim 14, wherein said source of electromagnetic radiation is a communications link.

18. The system of claim 14, wherein said scan path is a substantially conical scan path.

19. The system of claim 14, wherein said impairment is selected from the group consisting of a predictable aperiodic interruption to said modulated tracking signal, a loss of signal, a periodic obstruction to a line of sight towards said electromagnetic radiation, a multipath signal error, a complex modulation in said modulated tracking signal, an electrical noise, an electromagnetic noise, and a steering of said directional antenna towards a different source of electromagnetic radiation.

20. The system of claim 14, wherein said steering means spirals said scan path inward from a substantially steady state, equal amplitude scan path to approximately a point in anticipation of said impairment.

21. The system of claim 14, wherein said steering means spirals a scan path outward to a substantially steady state scan path during a non-impaired interval.

22. The system of claim 14, wherein said steering means apodizes said scan path utilizing a window function.

23. The system of claim 22, wherein said window function is selected from the group consisting of a rectangular window, a Hamming window, a Hann window, a Cosine window, a Lanczos window, a Gauss window, and a Nuttall window.

24. A system for orienting a receiver in a direction towards a source of electromagnetic radiation, comprising:

a directional antenna configured to scan in a closed scan path in an estimated direction of the source of the electromagnetic radiation to produce a modulated tracking signal; and a steering means for determining a scan path of a scan by said directional antenna, said steering means configured to modify said scan path to a modified scan path in anticipation of an impairment to said modulated tracking signal;

wherein a scan rate of said scan path is modified, based at least in part on a tracking signal input noise power spectrum, to a frequency that reduces an interference with said modulated tracking signal.

25. The system of claim 24, wherein said scan rate and an amplitude of a substantially conical scan path is dynamically selected to keep a signal-to-noise ratio of said modulated tracking signal above a predetermined threshold.

26. The system of claim 24, wherein said scan rate of said scan path is modified to a frequency that reduces an interference of a system noise.

* * * * *